US012316046B2

(12) United States Patent
Schneck et al.

(10) Patent No.: US 12,316,046 B2
(45) Date of Patent: May 27, 2025

(54) ELECTRICAL CONNECTOR WITH TETHERED SEALING CAPS

(71) Applicant: Hubbell Incorporated, Shelton, CT (US)

(72) Inventors: Andrew John Schneck, Cincinnati, OH (US); Chad Wesley Chesser, Red Level, AL (US); Kyle Howard Tyler, Eastford, CT (US)

(73) Assignee: Hubbell Incorporated, Shelton, CT (US)

(*) Notice: Subject to any disclaimer, the term of this patent is extended or adjusted under 35 U.S.C. 154(b) by 320 days.

(21) Appl. No.: 17/894,405

(22) Filed: Aug. 24, 2022

(65) Prior Publication Data

US 2023/0061690 A1 Mar. 2, 2023

Related U.S. Application Data

(60) Provisional application No. 63/390,225, filed on Jul. 18, 2022, provisional application No. 63/237,305, filed on Aug. 26, 2021.

(51) Int. Cl.

| | |
|---|---|
| ***H01R 13/533*** | (2006.01) |
| ***H01R 13/52*** | (2006.01) |
| ***H01R 13/523*** | (2006.01) |
| ***H01R 43/24*** | (2006.01) |

(52) U.S. Cl.

CPC ....... *H01R 13/533* (2013.01); *H01R 13/5213* (2013.01); *H01R 13/523* (2013.01); *H01R 43/24* (2013.01)

(58) Field of Classification Search

CPC . H01R 13/533; H01R 13/5213; H01R 13/523

USPC ........................................................ 439/587

See application file for complete search history.

(56) References Cited

U.S. PATENT DOCUMENTS

| | | | | |
|---|---|---|---|---|
| 3,512,118 A | | 5/1970 | Leonard | |
| 3,827,704 A | | 8/1974 | Gillemot et al. | |
| 4,283,597 A | | 8/1981 | Cooper, Jr. | |
| 4,460,227 A | | 7/1984 | Ball | |
| 4,648,672 A | | 3/1987 | Kobler | |
| 5,533,912 A | * | 7/1996 | Fillinger ............ | H01R 13/5213 439/718 |

(Continued)

OTHER PUBLICATIONS

ABB Installation Products (formerly Thomas & Betts) Homac Underground Distribution Catalogue, 2020 (92 pages).

(Continued)

*Primary Examiner* — Peter G Leigh

(74) *Attorney, Agent, or Firm* — Wissing Miller LLP

(57) ABSTRACT

A submersible cable connector for connecting a plurality of cable ends is provided. The submersible cable connector includes a connector body and an encapsulation member covering the connector body. The connector body has one or more cable receiving apertures or cavities and one or more fastener receiving apertures in communication with the cable receiving apertures. The encapsulation member includes integrally molded tubular cable ports in communication with the cable receiving apertures, spaced apart tubular fastener ports in communication with the fastener receiving apertures, and tethered sealing cap assemblies monolithically or integrally formed into the encapsulation member, and each configured to seal respective one of the fastener ports.

19 Claims, 14 Drawing Sheets

(56) References Cited

U.S. PATENT DOCUMENTS

| | | | | |
|---|---|---|---|---|
| 6,764,354 | B2 | 7/2004 | Kaine et al. | |
| 6,817,910 | B2 * | 11/2004 | Borgstrom | H01R 4/36 439/798 |
| 6,997,759 | B1 * | 2/2006 | Zahnen | H01R 13/5213 439/798 |
| 7,090,532 | B1 * | 8/2006 | Kaine | H01R 13/523 439/523 |
| 7,094,094 | B2 * | 8/2006 | Zahnen | H01R 13/5208 439/798 |
| 7,118,427 | B2 * | 10/2006 | Zahnen | H01R 13/5213 439/798 |
| 7,144,279 | B2 * | 12/2006 | Zahnen | H01R 9/223 439/910 |
| 7,572,155 | B2 * | 8/2009 | Elliott, III | H01R 13/5205 439/709 |
| 7,717,740 | B2 * | 5/2010 | Zahnen | H01R 13/523 439/798 |
| 7,874,872 | B2 | 1/2011 | Kaine | |
| 7,927,119 | B2 * | 4/2011 | Zahnen | H01R 13/5213 439/276 |
| 9,822,955 | B2 * | 11/2017 | Mayo | H01R 13/635 |
| 2003/0087552 | A1 | 5/2003 | Borgstrom | |
| 2004/0121639 | A1 * | 6/2004 | Yaworski | H01R 13/5216 439/276 |
| 2006/0155280 | A1 * | 7/2006 | Siebens | H01R 4/36 439/810 |
| 2006/0286862 | A1 * | 12/2006 | Lubinsky | H01R 4/12 439/798 |
| 2007/0281538 | A1 * | 12/2007 | Elliott | H01R 13/5205 439/405 |
| 2008/0009184 | A1 | 1/2008 | Zahnen | |
| 2008/0268721 | A1 * | 10/2008 | Waltz | H01R 4/36 439/810 |
| 2009/0081897 | A1 * | 3/2009 | Waltz | H01R 13/533 29/428 |

OTHER PUBLICATIONS

ABB Installation Products (formerly Thomas & Betts) Homac RAB 350 Brochure, Nov. 2018 (4 pages).
Burndy Unitap Catalog, 2016 (7 pages).
Burndy 350-12 DB UNITAP 4 PORT Spec Sheet, Sep. 13, 2014 (1 page).
Ilsco StreetWise Brochure, 2019 (2 pages).
International Search Report and Written Opinion mailed in corresponding PCT Application No. PCT/US22/41322 on Nov. 16, 2022 (9 pages).
International Preliminary Report on Patentability in corresponding International Application No. PCT/US2022/041322 mailed on Mar. 7, 2024. (8 pages).

* cited by examiner

ELECTRICAL CONNECTOR WITH TETHERED SEALING CAPS

CROSS-REFERENCE TO RELATED APPLICATIONS

The present disclosure is based on and claims benefit from U.S. Provisional Patent Application Ser. No. 63/390,225 filed on Jul. 18, 2022 entitled "Connector with Tethered Caps" and from U.S. Provisional Application Ser. No. 63/237,305 filed on Aug. 26, 2021 entitled "Connector with Tethered Caps" the contents of each are incorporated herein in their entirety by reference.

BACKGROUND

Field

The present disclosure relates generally to electrical connectors, and more particularly, to submersible electrical cable connectors for connecting a plurality of cable ends.

Description of the Related Art

Underground and/or submersible electrical cable connectors are generally well-known and widely used for making connections between power conductors in electrical power distribution systems. These connectors typically include a body formed of a rigid material and having at least a few sets of spaced apart ports extending from the body at right angle relative one another. Generally, one of the sets is adapted to receive the ends of electrical conductors, and another set is adapted to receive fasteners for securing the ends of the electrical conductors in a mechanical and/or electrical engagement to the body. To ensure longevity of the connectors in an underground environment and/or to electrically insulate them, these connectors are typically coated in an insulating covering. Additionally, various auxiliary components are provided with these connectors, such as sealing plugs for capping the set of ports that receives fasteners and cable adapters that are insertable into the set of ports that receives the electrical conductors to accommodate conductors of various sizes. Unfortunately, however, when installing and/or maintaining the connectors in the field, utility workers often have trouble removing these sealing plugs. It is also common for the utility workers to drop, misplace or lose these sealing plugs when they are removed. Prior solutions adopted by connector manufacturers to provide sealing plugs that mate with the body of these connectors adds to the assembly time and cost to manufacture the connectors.

SUMMARY

The present disclosure provides embodiments of a submersible electrical cable connector that, among other benefits, has cap assemblies that are monolithically integrated with an encapsulation overmold that encases the rigid, electrically conductive body of the cable connector. This eliminates the extra steps in the manufacturing process of creating and attaching the cap assemblies to the cable connector. Permanently tethering the cap assemblies, e.g., sealing caps, to the encapsulation member surrounding the rigid body helps ensure that utility workers will not drop or lose the cap assemblies, e.g., the sealing caps, once they are removed for a set screw installation. Additionally, the cap assemblies, e.g., sealing caps, of the present disclosure have a large pull tab that helps remove the cap assemblies by hand or with pliers. Hollowed-out sections of each of the cap assemblies make the cap assemblies of the present disclosure lighter and more flexible, which also helps with ease of installation as more rigid and bulky plugs tend to cause difficulty when installing. Further, the conductor ports of the cable connector are dimensioned to allow cable adapters, when inserted, to enter the rigid body of the cable connector by a predetermined distance, which limits and possibly prevents environmental elements from coming into the rigid body via the conductor or cable ports.

In an exemplary embodiment, the submersible electrical cable connector for connecting a plurality of cable ends includes a connector body and an encapsulation overmold covering the connector body. The encapsulation overmold may also be referred to herein as the encapsulation member. The connector body has a front side and an upper side. The front side includes a plurality of cable receiving apertures, and the upper side includes a plurality of fastener receiving apertures in communication with and generally perpendicularly oriented to the cable receiving apertures. The encapsulation overmold includes integrally molded spaced apart tubular cable ports extending from the front side of the connector body and in communication with the cable receiving apertures. The encapsulation overmold also includes integrally molded spaced apart tubular fastener ports extending from the upper side of the connector body and in communication with the fastener receiving apertures. Tethered sealing caps are monolithically formed with the encapsulation overmold and each tethered sealing cap is configured to cap one of the fastener ports.

In another exemplary embodiment, the submersible electrical cable connector according to the present disclosure includes a connector body, an encapsulation overmold covering the connector body, and one or more cable adapters. The connector body has a front side and an upper side. The front side includes a plurality of cable receiving apertures, and the upper side includes a plurality of fastener receiving apertures in communication with and generally perpendicularly oriented to the cable receiving apertures. The encapsulation overmold includes spaced apart tubular cable ports extending from the front side of the connector body and in communication with the cable receiving apertures. The encapsulation overmold also includes spaced apart tubular fastener ports extending from the upper side of the connector body and in communication with the fastener receiving apertures. The cable adapters are shaped and sized for insertion into the cable ports and each cable port includes a length allowing respective one of the cable adapters to extend into the interior cavity of the connector body by a predetermined distance.

In another exemplary embodiment, the cable connector according to the present disclosure includes a connector body, an encapsulation member and a plurality of cap assemblies. The connector body has a first side and a second side. The first side includes a plurality of cable cavities, and the second side includes a plurality of fastener receiving apertures. In this configuration, one cable cavity is in communication with one fastener receiving aperture. The encapsulation member covers, encases or surrounds the connector body. The encapsulation member includes a plurality of cable ports and a plurality of fastener ports. Each cable port has a hollow center portion, and extends from the first side of the connector body such that the hollow center portion of the cable port is in communication with one of the cable cavities. Each fastener port has a hollow center portion defining an interior surface of the fastener port. Each fastener port extends from the second side of the connector body such that the hollow center portion of the fastener port is in communication with one of the fastener receiving apertures. Each cap assembly has a tether with a seal member at a first end. A second end of the tether is formed, e.g., monolithically formed, into the encapsulation member. The seal member of each cap assembly is preferably configured to be inserted into the hollow center portion of one of the fastener ports. The cable connector according to the present disclosure may also include a plurality of cable adapters. Each cable adapter is configured to receive a range of conductor sizes, and is shaped and sized for insertion into the hollow center portion of one of the cable ports. When one of the cable adapters is inserted into the hollow center portion of one of the cable ports, the cable adapter extends at least partially into one of the cable cavities.

In another exemplary embodiment, the cable connector according to the present disclosure includes a connector body, an encapsulation member, a plurality of cable ports, a plurality of fastener ports and a plurality of cap assemblies. The connector body has a first side and a second side. The first side includes a plurality of cable cavities and the second side includes a plurality of fastener receiving apertures, where one cable cavity is in communication with one fastener receiving aperture. The encapsulation member surrounds the connector body and provides access to each of the plurality of cable cavities and each of the plurality of fastener receiving apertures. Each cable port has a hollow center portion, and extends from the first side of the connector body so that the hollow center portion of the cable port is in communication with one of the cable cavities. Each fastener port has a hollow center portion, and extends from the second side of the connector body so that the hollow center portion of the fastener port is in communication with one of the fastener receiving apertures. Each cap assembly includes a tether having a seal member at a first end. A second end of the tether is attached to or formed into, e.g., monolithically formed into, the encapsulation member. The seal member is configured to be at least partially inserted into the hollow center portion of one of the fastener ports.

In another exemplary embodiment, the cable connector according to the present disclosure includes a connector body, an encapsulation member and a plurality of cap assemblies. In this embodiment, the connector body has a first side and a second side. The first side includes a plurality of cable cavities and the second side includes a plurality of fastener receiving apertures, where one cable cavity is in communication with one fastener receiving aperture. The encapsulation member covers the connector body, and includes a plurality of cable ports and a plurality of fastener ports. The cable ports extend from the first side of the connector body. Each cable port has a hollow center portion, and one end integrally or monolithically molded into the encapsulation member so that the hollow center portion of the cable port is in communication with one of the cable cavities. The fastener ports extend from the second side of the connector body. Each fastener port has a hollow center portion, and one end integrally or monolithically molded into the encapsulation member so that the hollow center portion of the fastener port is in communication with one of the fastener receiving apertures. Each cap assembly includes a tether with a seal member at a first end. A second end of the tether is formed, e.g., monolithically formed, into the encapsulation member. The seal member is configured to be at least partially inserted into the hollow center portion of one of the fastener ports.

In the embodiments contemplated by the present disclosure, preferably, each cable port is integrally or monolithically molded into the encapsulation member, and each fastener port is integrally or monolithically molded into the encapsulation member.

In the embodiments contemplated by the present disclosure, each of the fastener receiving apertures may be at least partially threaded apertures so that a fastener can be threaded at least partially into each of the plurality of fastener receiving apertures.

In the embodiments contemplated by the present disclosure, the seal member for each of the cap assemblies may include at least one rib extending around an exterior surface of the seal member and outwardly from the exterior surface of the seal member so that when the seal member is inserted into the hollow center portion of one of the fastener ports the at least one rib contacts the interior surface of the fastener port.

In the embodiments contemplated by the present disclosure, each cable ports may include at least one supporting rib extending from an exterior surface of each of the cable port, and a portion of the at least one supporting rib may be formed, e.g., monolithically formed, into the encapsulation member.

BRIEF DESCRIPTION OF THE DRAWINGS

The figures depict embodiments for purposes of illustration only. One skilled in the art will readily recognize from the following description that alternative embodiments of the structures illustrated herein may be employed without departing from the principles described herein, wherein.

Figure 1:
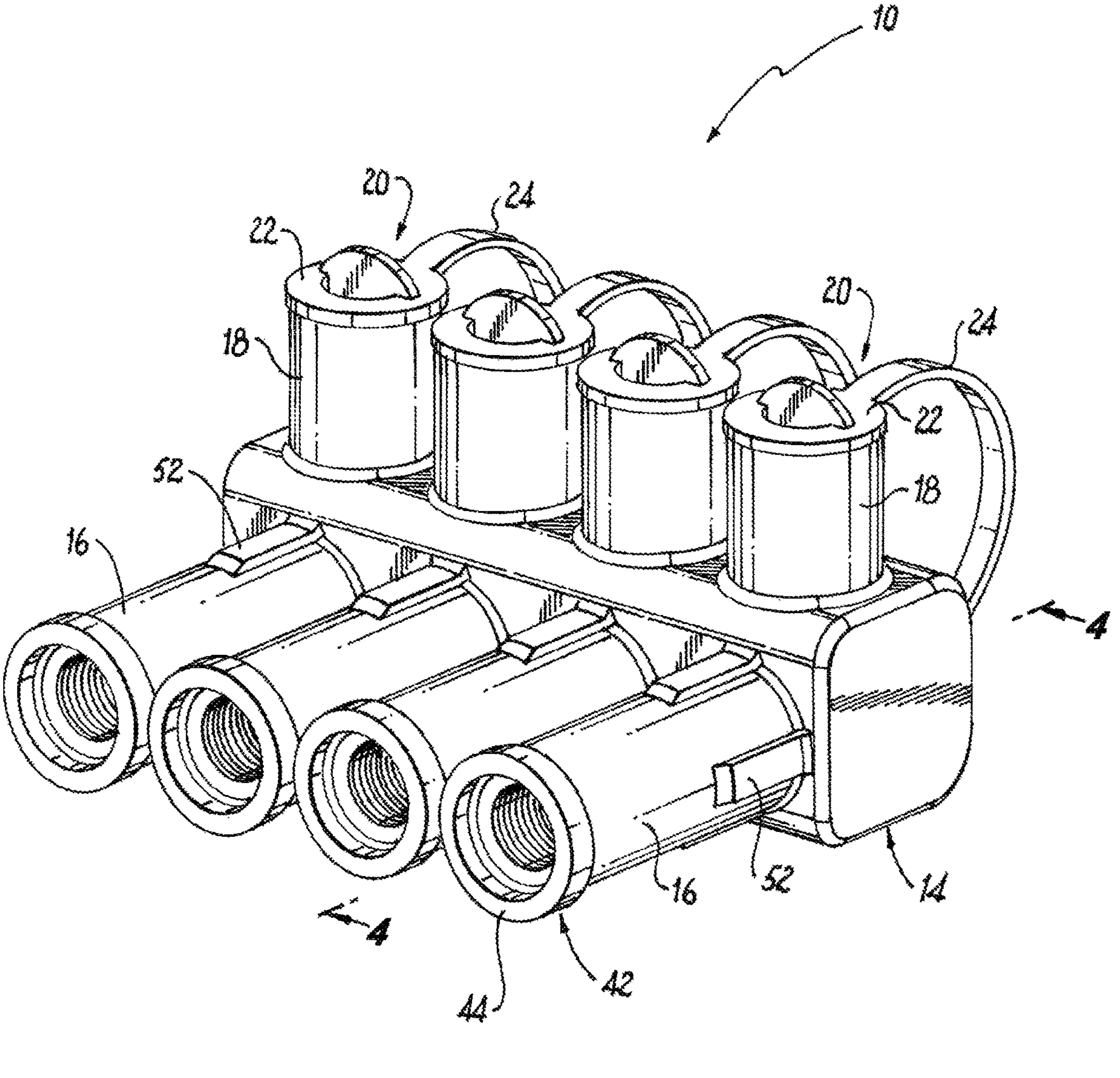
FIG. 1 is a perspective view of a submersible electrical cable connector according to the present disclosure.
Figure 6A:
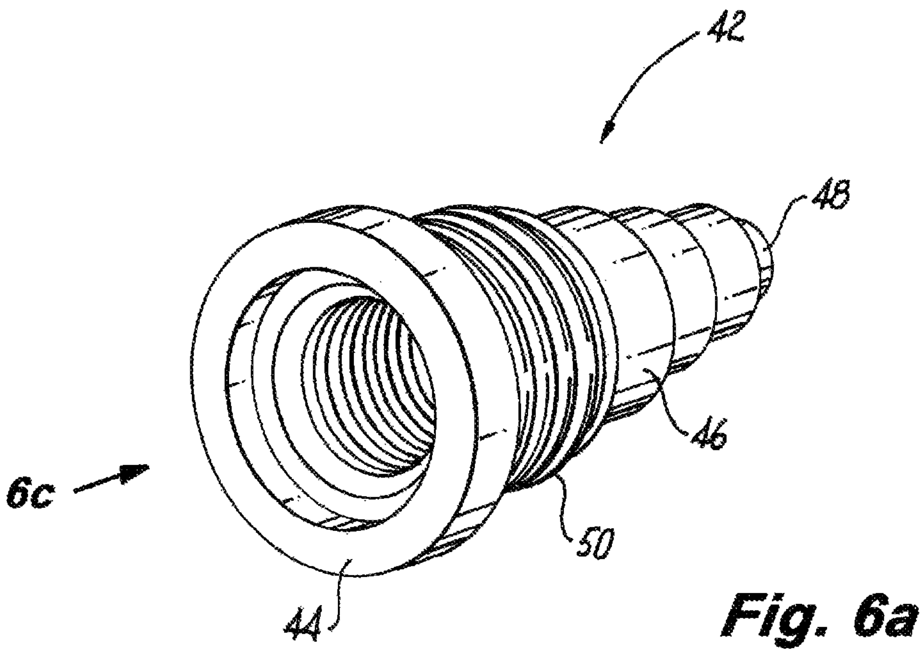
Figure 6B:
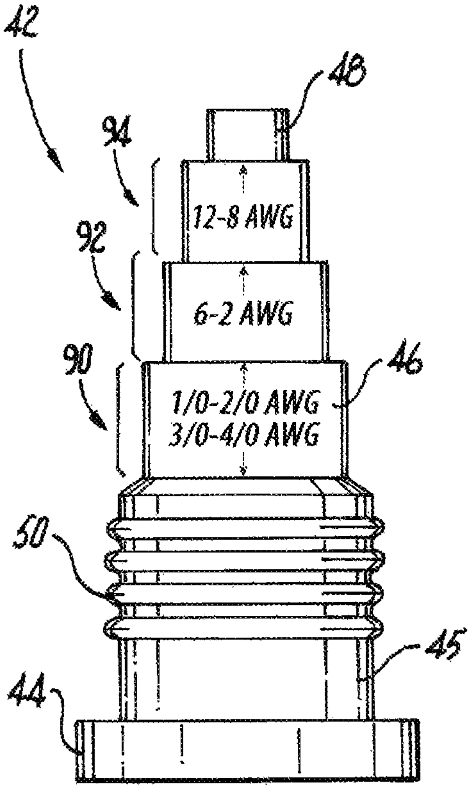
Figure 6C:
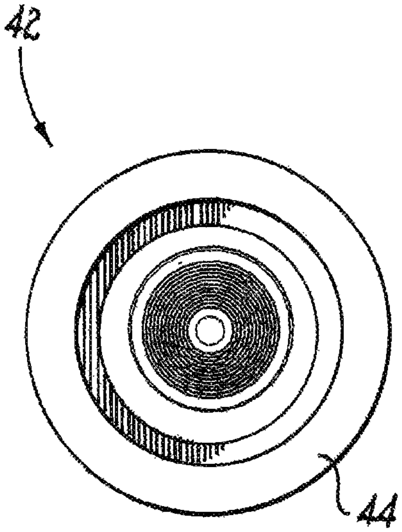
Figure 7A:
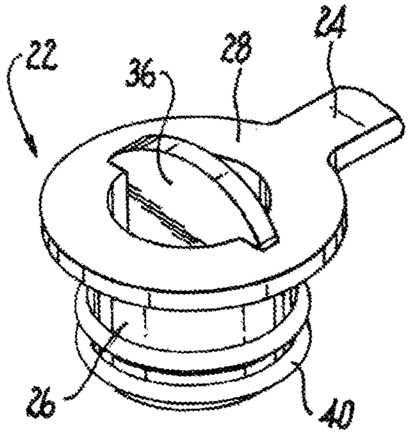
Figure 7B:
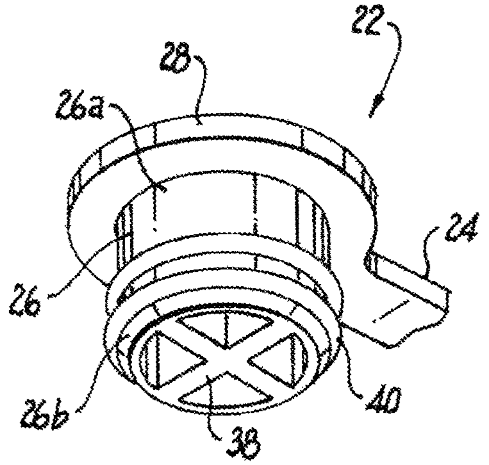
Figure 7C:
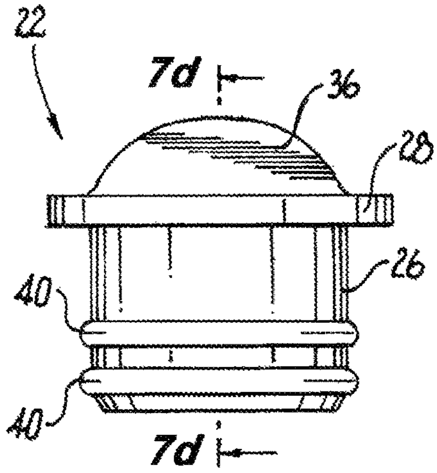
Figure 8:
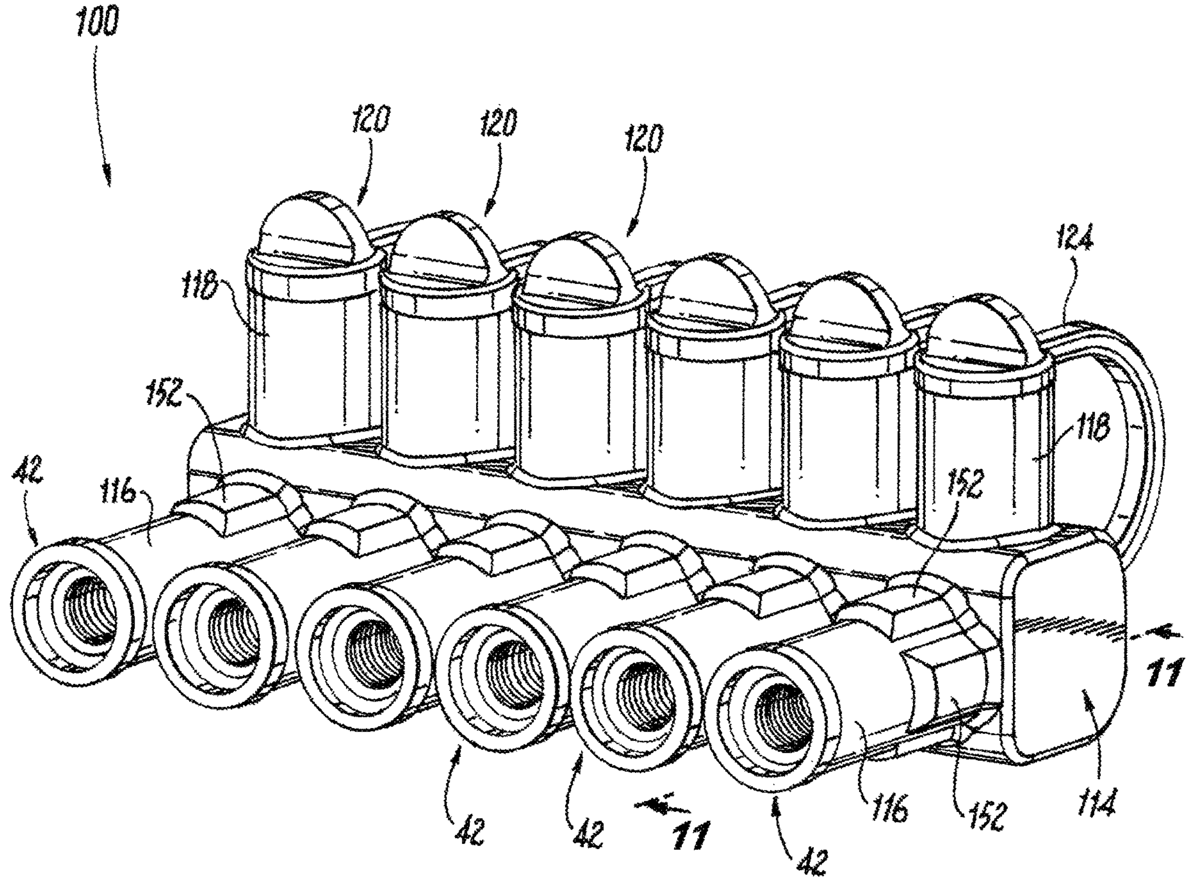
Figure 9:
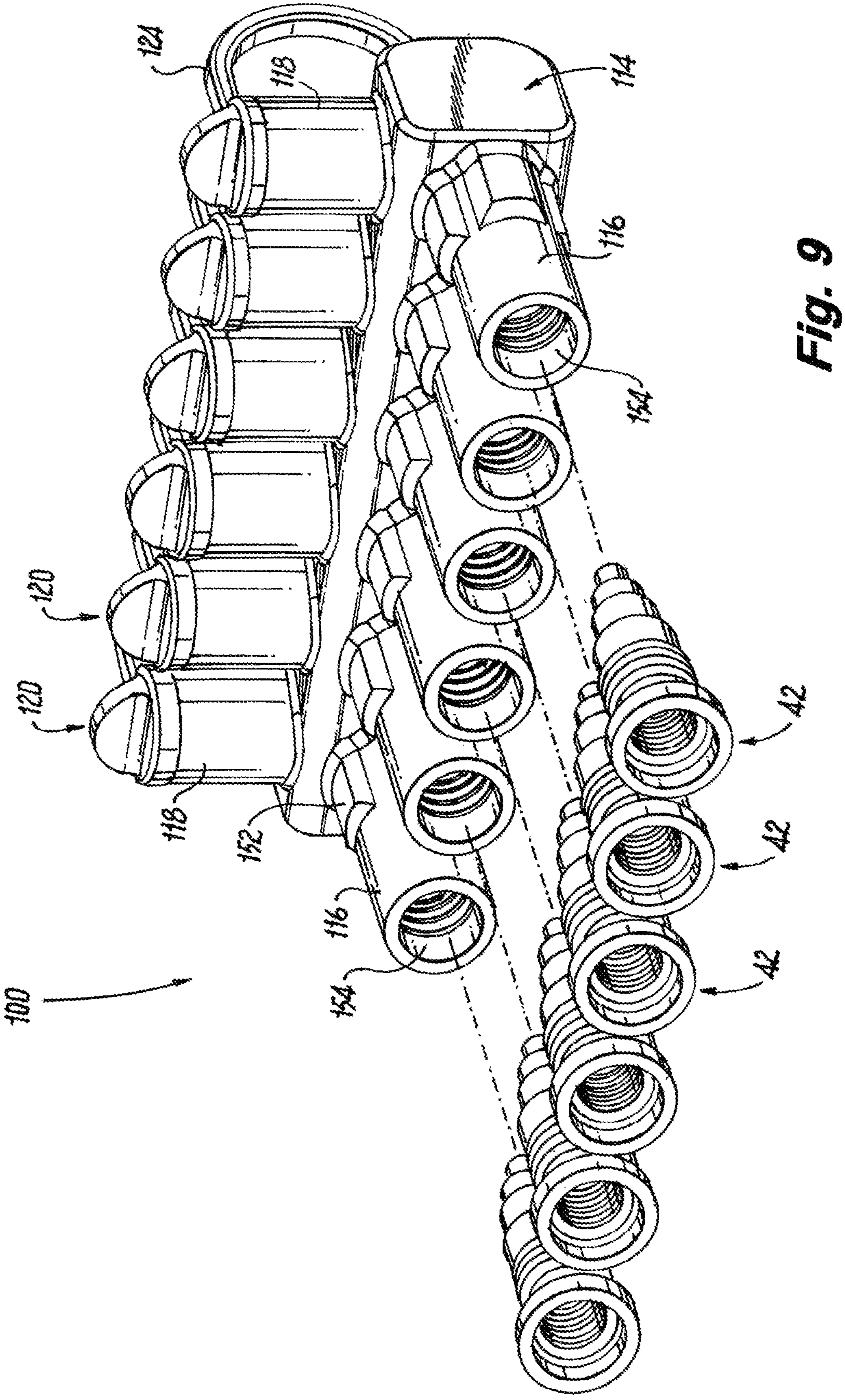
Figure 10:
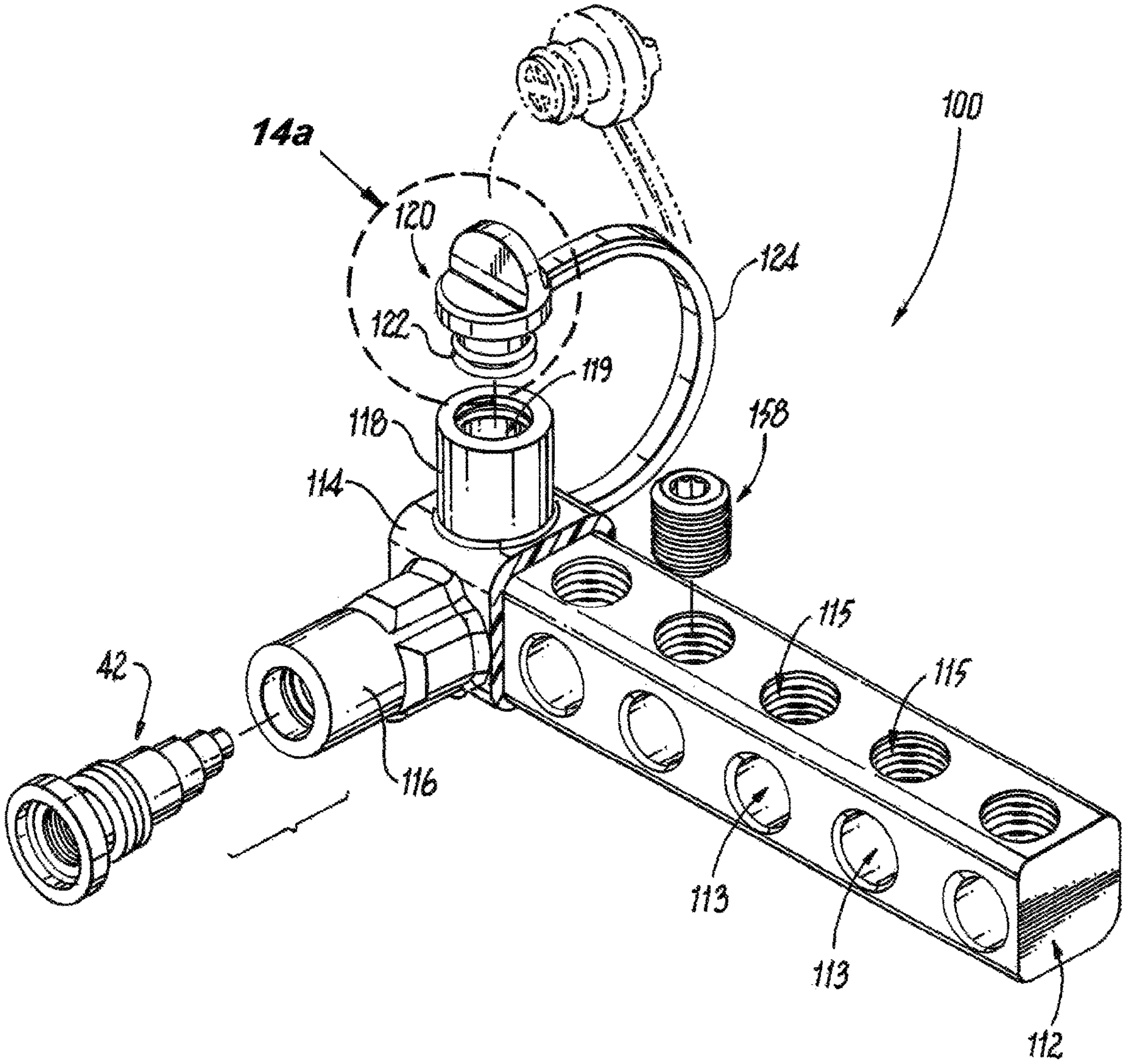
Figure 11:
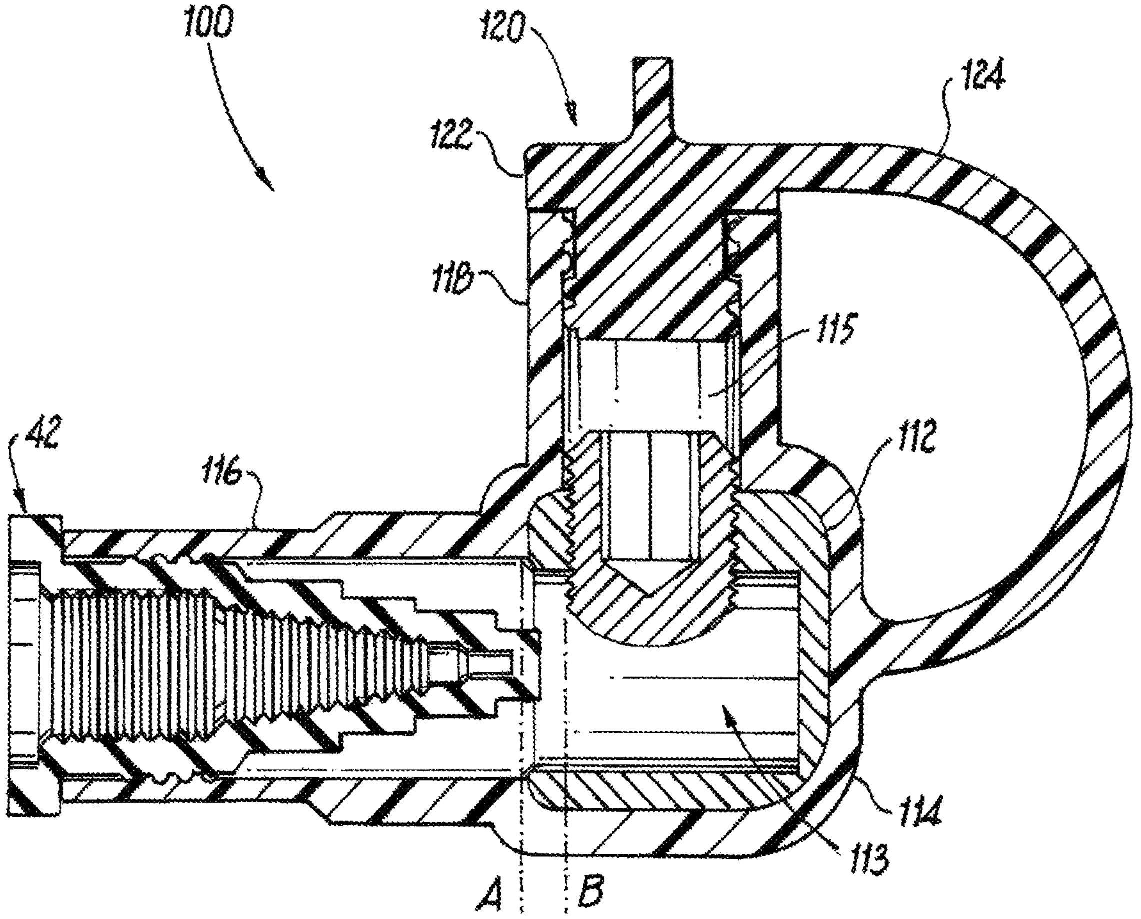
Figure 12:
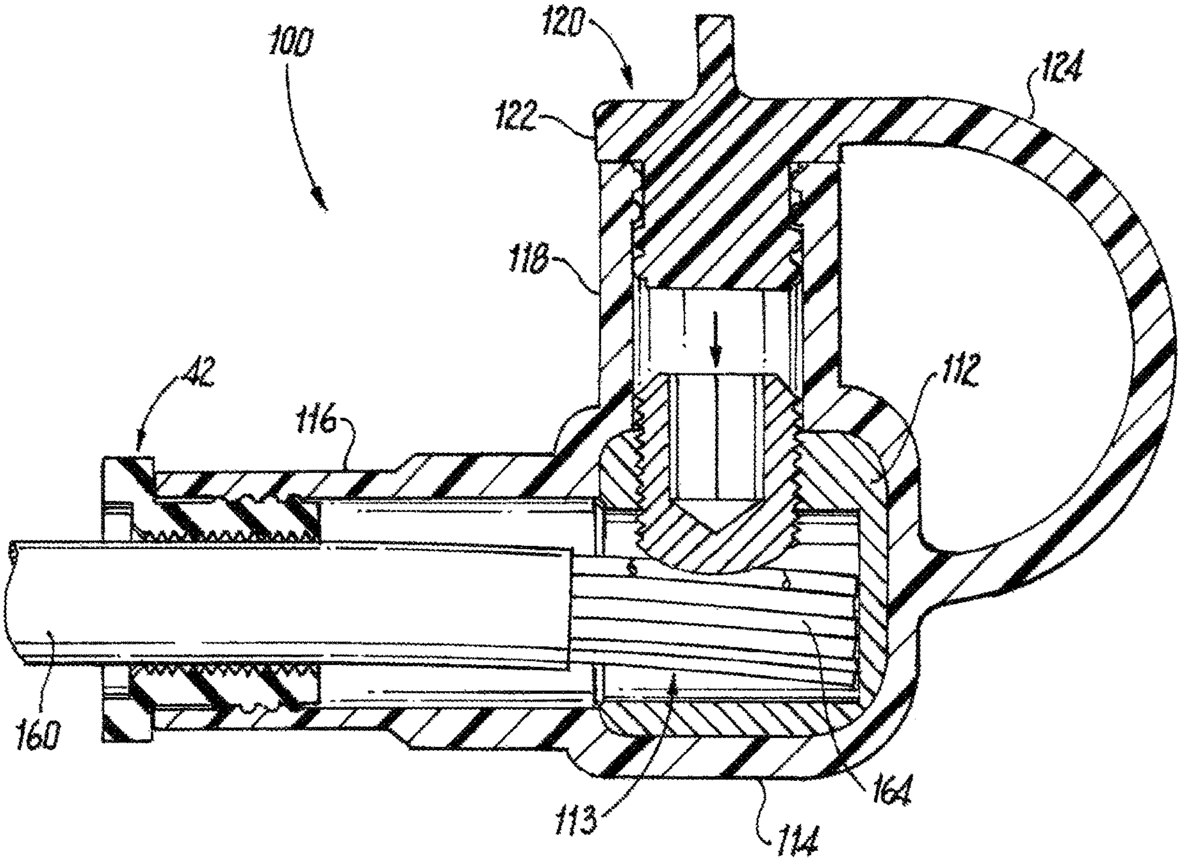
Figure 13:
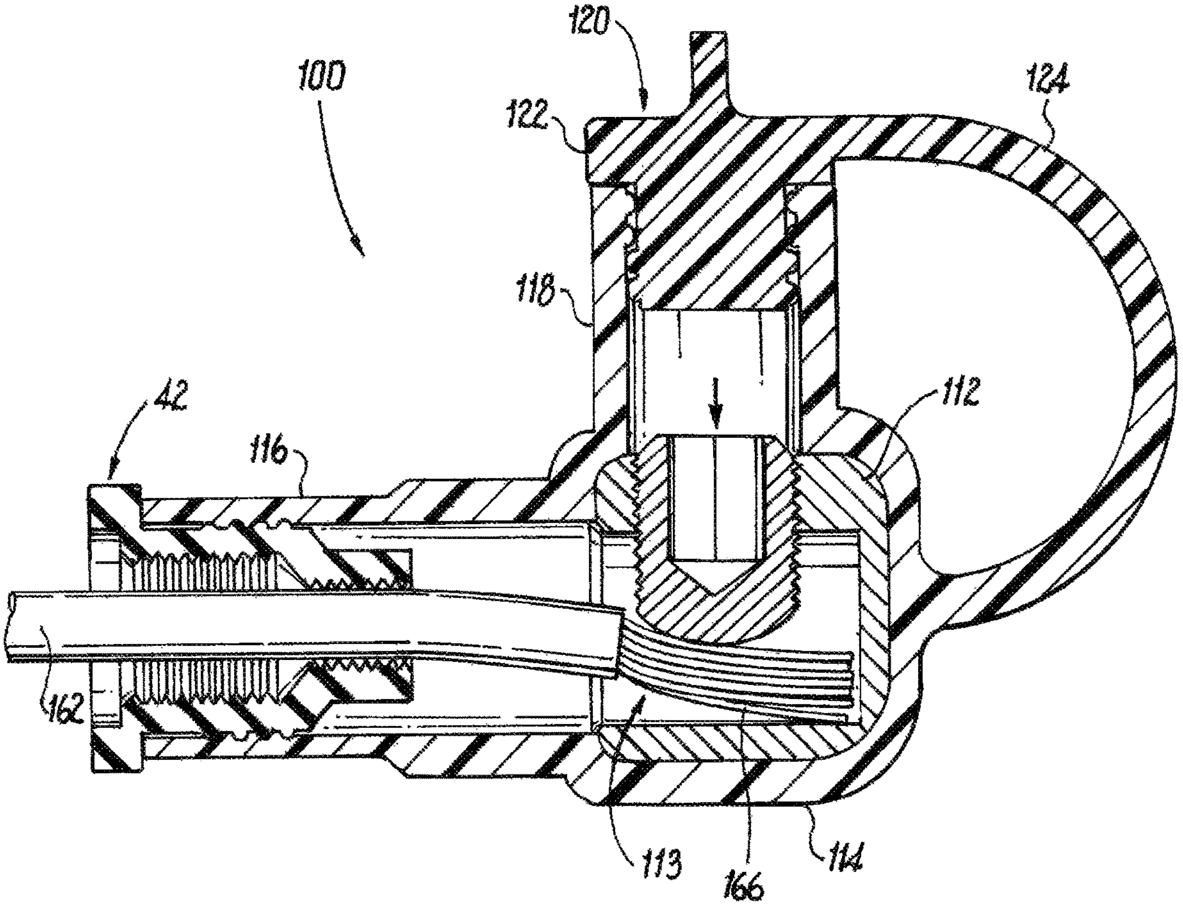
Figure 14A:
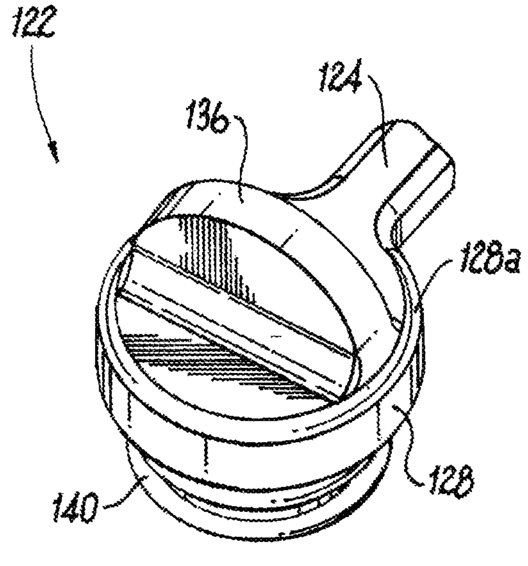
Figure 14B:
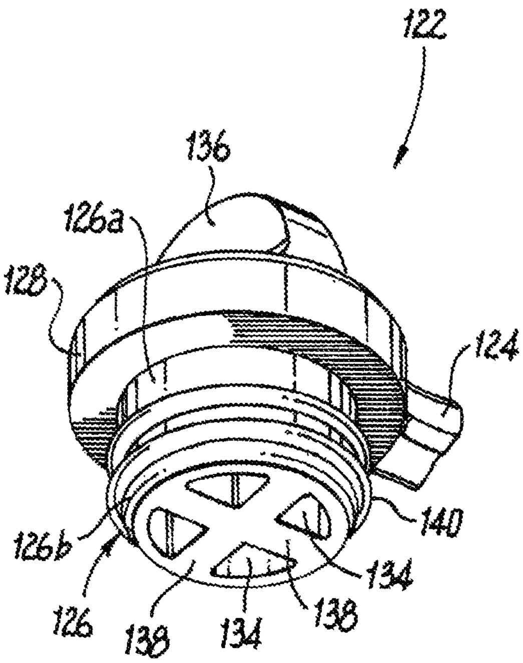

FIG. **6*a*** is a perspective view of an exemplary embodiment of a cable adapter according to the present disclosure;

FIG. **6*b* is a side elevation view of the cable adapter of FIG. 6*a***;

FIG. **6*c* is an end elevation view of the cable adapter of FIG. 6*a***;

FIG. **7*a* is a top perspective view of the sealing cap of the electrical cable connector of FIG. 1**;

FIG. **7*b* is a bottom perspective view of the sealing cap of FIG. 7*a***;

FIG. **7*c* is a side elevation view of the sealing cap of FIG. 7*a***;

FIG. **7*d* is a cross-sectional view of the sealing cap of FIG. 7*c* taken along the line 7*d*-7*d***;

FIG. 8 is perspective view of another exemplary embodiment of the electrical cable connector according to the present disclosure;

FIG. 9 is a perspective view of the electrical cable connector of FIG. 8, illustrating cable adapters in accordance with the present disclosure immediately prior to being inserted into or after having been removed from wire way bosses of the electrical cable connector;

FIG. 10 is an exploded perspective view in partial cross-section of the electrical cable connector of FIG. 9, illustrating an exposed portion of a connector body after a portion of an encapsulation overmold has been removed from the connector body;

FIG. 11 is a cross-sectional view of the electrical cable connector of FIG. 8 taken along the lines 11-11, illustrating a relationship between the cable adapter and the wire way boss;

FIG. 12 is the cross-sectional view of the electrical cable connector of FIG. 11, illustrating an electrical conductor of a first size inserted in the connector body of the electrical cable connector;

FIG. 13 is the cross-sectional view of the electrical cable connector of FIG. 11, illustrating an electrical conductor of a second size inserted in the connector body of the electrical cable connector;

FIG. 14*a* is a top perspective view of the sealing cap of the electrical connector of FIG. 8;

FIG. 14*b* is a bottom perspective view of the sealing cap of FIG. 14*a;*

Figure 14C:
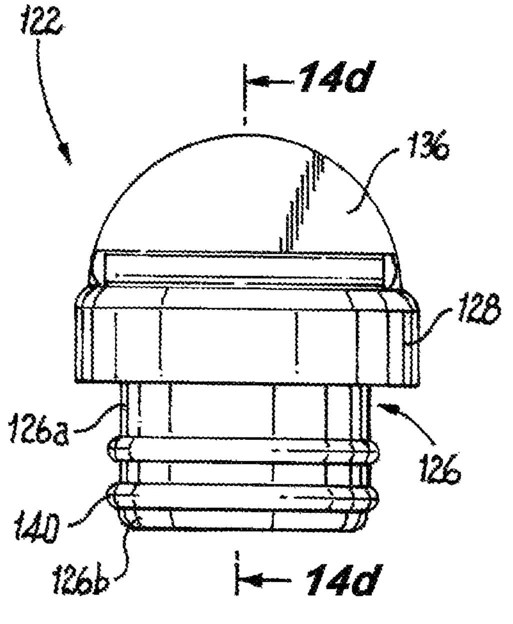
Figure 14D:
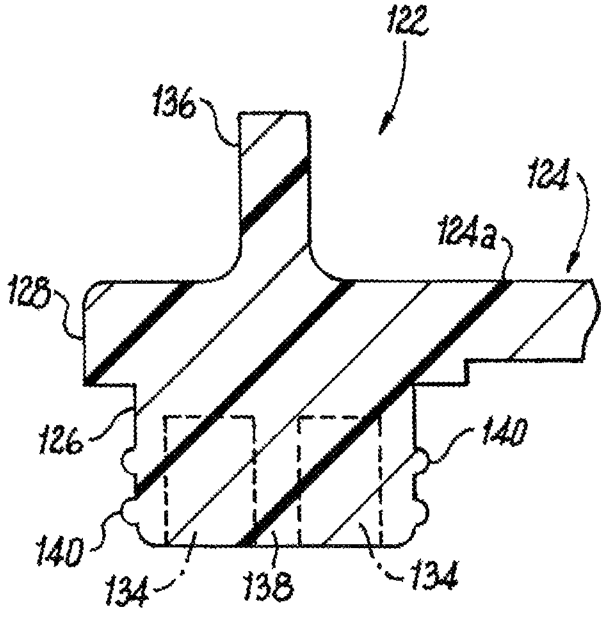

FIG. 14*c* is a side elevation view of the sealing cap of FIG. 14*a*; and FIG. 14*d* is a cross-sectional view of the sealing cap of FIG. 14*c* taken along the line 14*d*-14*d*.

DETAILED DESCRIPTION

The present disclosure provides exemplary embodiments of a submersible electrical cable connector with tethered sealing caps used to cover openings in the submersible electrical cable connector. The submersible electrical cable connector according to the present disclosure is to be used to make quick and easy tap connections, terminations, and in-line splices of one or more conductors in a variety of configurations. Non-limiting examples of the one or more conductors include a single electrical conductor wire, a bundle of electrical conductor wires, laminated strips of conductors, any combination thereof or any other aluminum, copper-clad aluminum, or copper conductor. For ease of description, the submersible electrical cable connector may also be referred to as the "cable connector" in the singular and as the "cable connectors" in the plural. Also, for ease of description, the sealing cap may also be referred to as the "cap" in the singular and as the "caps" in the plural. The specification and drawings are to be regarded in an illustrative sense rather than a restrictive sense. Various modifications may be made thereto without departing from the spirit and scope as set forth in the following claims.

Figure 2:
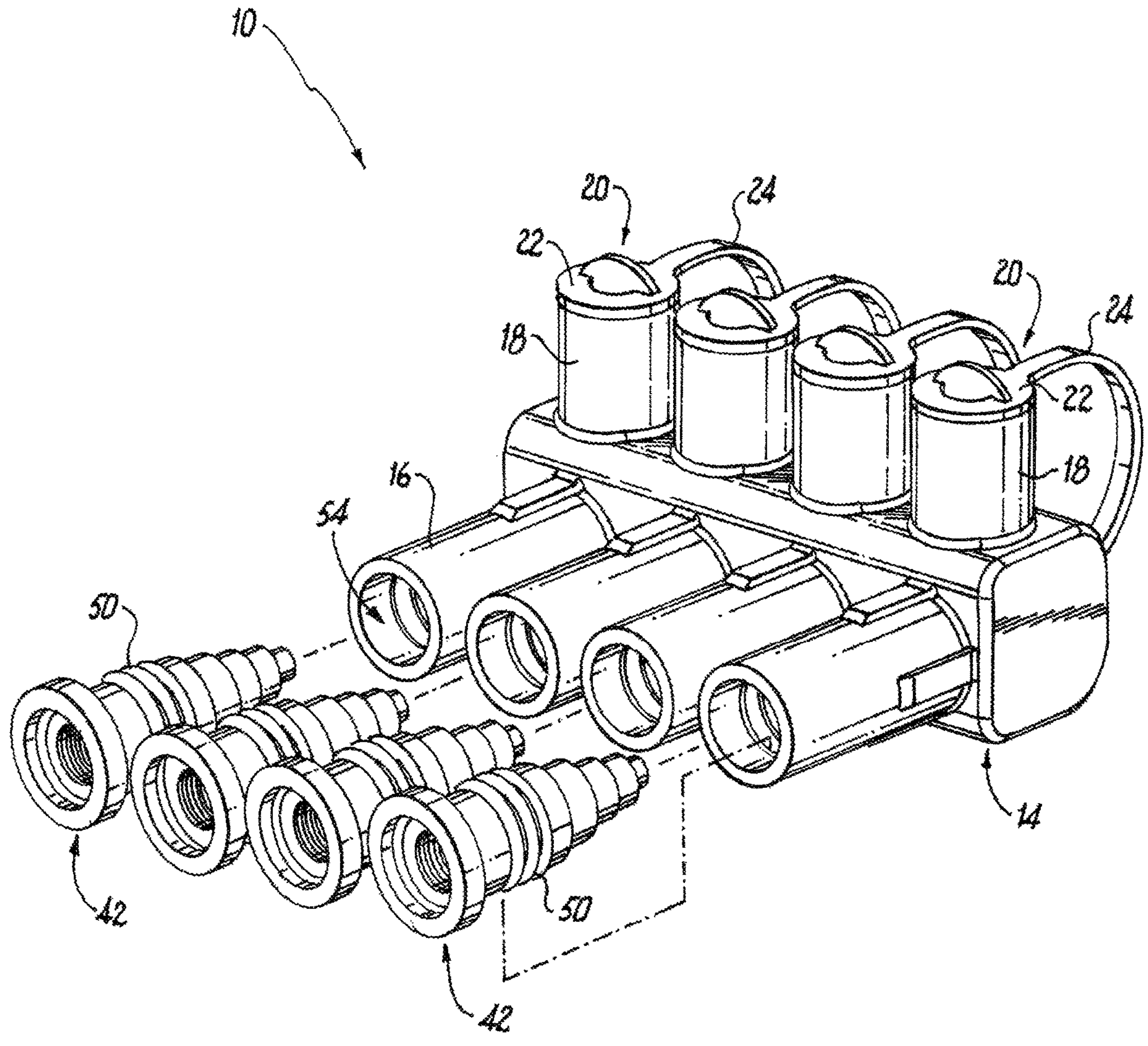
FIG. 2 is a perspective view of the electrical cable connector of FIG. 1, illustrating cable adapters in accordance with the present disclosure immediately prior to being inserted into or after having been removed from wire way bosses of the electrical cable connector.
Figure 3:
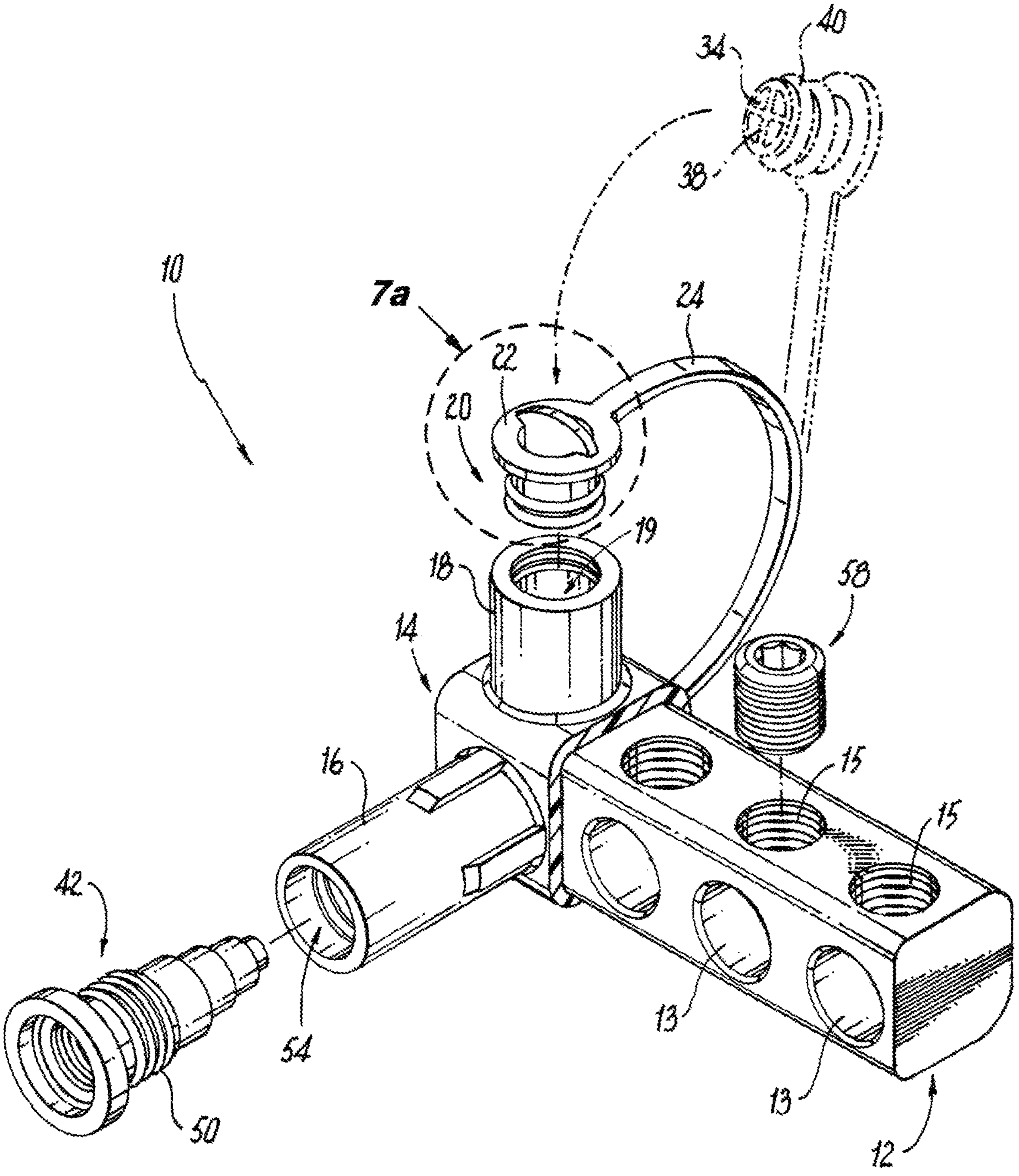
FIG. 3 is an exploded perspective view in partial cross-section of the electrical cable connector of FIG. 2, illustrating an exposed portion of a connector body after a portion of an encapsulation overmold has been removed from the connector body.
Figure 4:
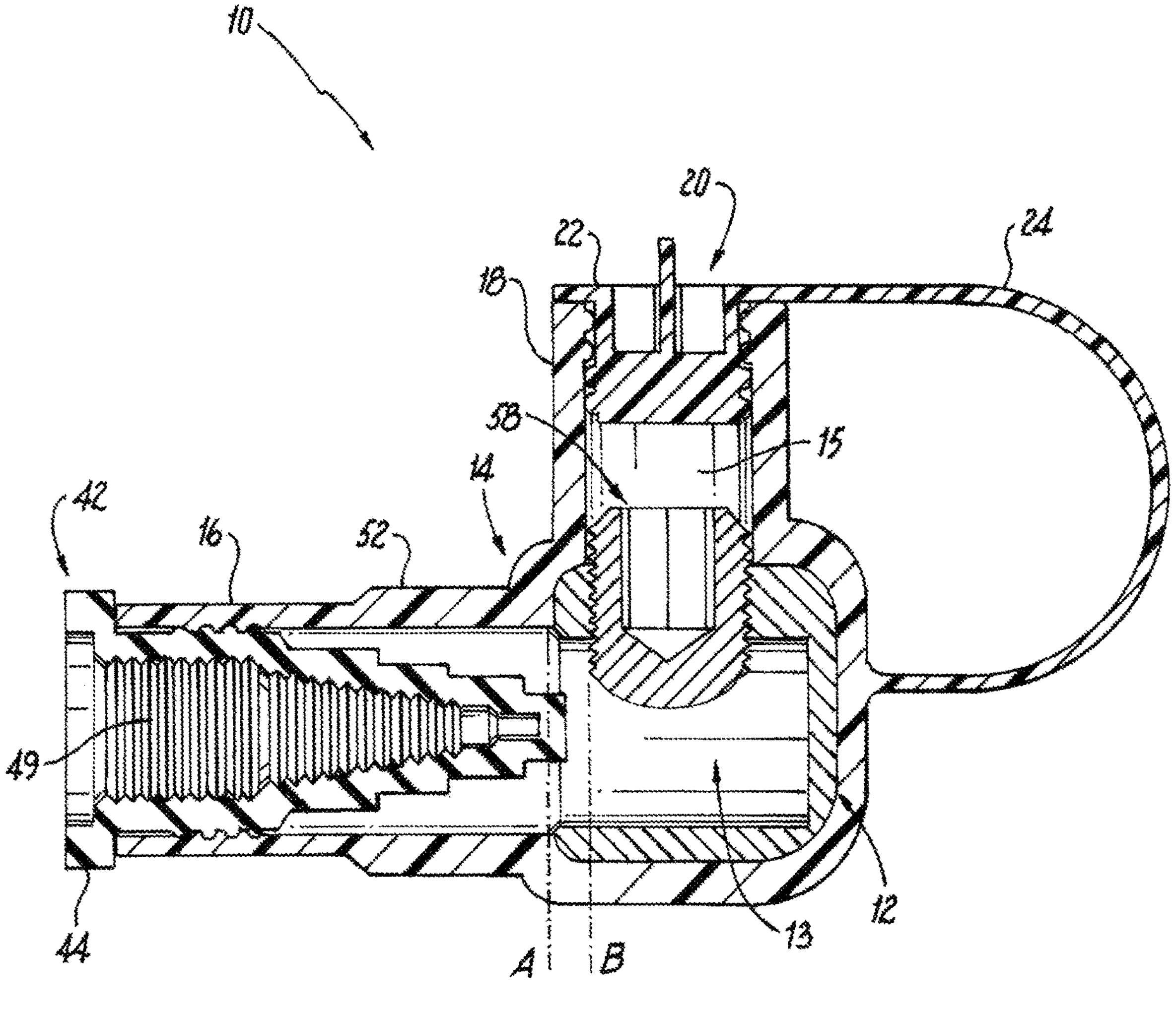
FIG. 4 is a cross-sectional view of the electrical cable connector of FIG. 1 taken along the lines 4-4, illustrating a relationship between the cable adapter and the wire way boss.

Referring now to FIGS. 1-5 and 6*a*-6*c*, an exemplary embodiment of a cable connector 10 according to the present disclosure is shown. In this exemplary embodiment, the cable connector 10 includes a connector body 12 that is encased or covered in a layer of insulating material 14, as seen in FIG. 3. In the exemplary embodiment shown, the connector body 12 is a generally rectangular body. However, the connector body may be square in shape, cylindrical in shape or any other suitable shape to make the electrical connections described herein. The connector body 12 is preferably formed of electrically conductive metallic material, such as aluminum, aluminum alloy, copper or brass. The connector body 12 includes one or more spaced apart wire cavities 13 arranged along one side of the connector body 12 and one or more spaced apart apertures 15 arranged along an adjacent side of the connector body 12, as shown in FIG. 3. In the exemplary embodiment shown in FIG. 3, each aperture 15 is oriented at right angle relative to a respective wire cavity 13. Each aperture 15 intersects the wire cavity 13, as seen in FIG. 4, so that the wire way cavity 13 of the connector body 12 is in communication with the respective aperture 15. Preferably, each wire cavity 13 and aperture 15 are blind holes, i.e., they extend inwardly into the connector body 12, but do not extend fully through the connector body 12.

Figure 5:
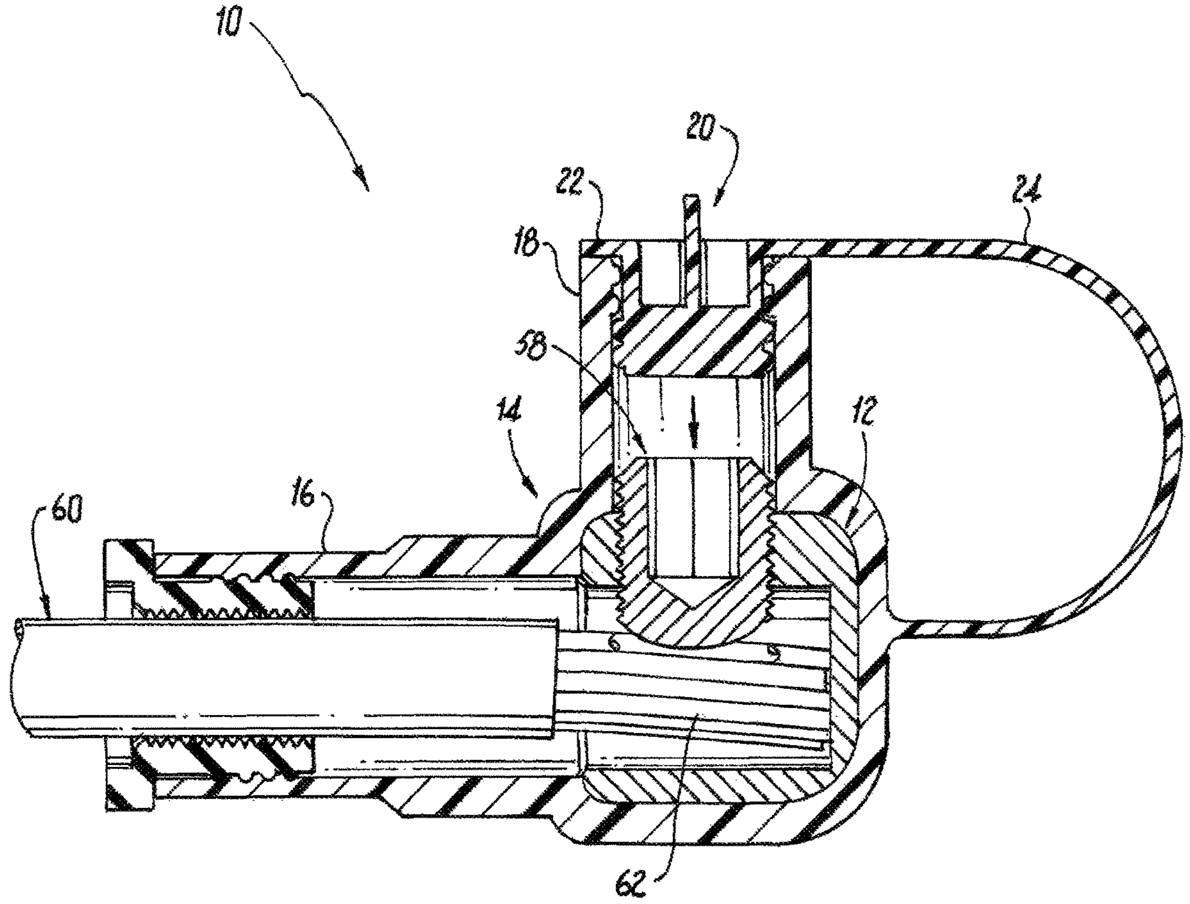
FIG. 5 is the cross-sectional view of the electrical cable connector of FIG. 4, illustrating an electrical conductor inserted in the connector body of the electrical cable connector.

The layer of insulating material 14 may be an injection molded thermoplastic or elastomeric compound that is formed to substantially surround or overmold the connector body 12. For ease of description, the layer of insulating material 14 may also be referred to herein as the encapsulation member 14. The encapsulation member 14 is formed or molded to include one or more spaced apart tubular and generally hollow ports 16, each of which may also be referred to herein as a wire way boss. Each wire way boss 16 extends outwardly from the same side of the connector body 12 as the wire cavities 13 so that the wire cavities 13 are in communication with the hollow portion of the wire way bosses 16. The wire way bosses 16 provide access to the wire cavities 13 so that one or more conductors 60 can pass through the wire way bosses 16 into the wire cavity 13, as shown in FIG. 5. The encapsulation member 14 also includes one or more spaced apart tubular and generally hollow ports 18, each of which may also be referred to herein as a fastener boss. Each fastener boss 18 extends outwardly from the same side of the connector body 12 as the aperture 15 so that the apertures 15 are in communication with the hollow portion 19 of the fastener bosses 18. The fastener bosses 18 provide access to the apertures 15 so that one or more fasteners 58, e.g., set screws, in the connector body 12 can be accessed by utility workers with conventional tools, or so that one or more fasteners 58 can be pass through the fastener bosses 18 into the apertures 15, as shown in FIGS. 3-5. As it should be apparent from FIG. 5, each fastener 58 can then be tightened to secure a conductor 60 extending in respective one of the wire cavities 13 to the connector body 12. In the exemplary embodiment shown, like each wire cavity 13 and aperture 15 pair, the wire way bosses 16 are oriented at right angle to the fastener bosses 18.

Continuing to refer to FIGS. 3-5, the encapsulation member 14 is formed or molded to further include one or more cap assemblies 20. Each cap assembly 20 includes a seal member 22 and a tether 24, seen in FIG. 3. For ease of description, the cap assemblies 20 may also be referred to herein as the "cap" in the singular and the "caps" in the plural. The tether 24 of the cap 20 is preferably monolithically or integrally formed into the encapsulation member 14 during, for example, the injection molding process so that the tether 24 is permanently attached to the encapsulation member 14. The seal members 22 of the caps 20, which are described in more detail below, are configured to cover or cap the hollow openings 19 of the fastener bosses 18, as shown in FIGS. 1-5.

As mentioned, the process that forms the encapsulation member 14, e.g., an injection molding process, also forms the caps 20 as one monolithically or integrally formed unit. The tether 24 of each cap 20 is a flexible tether that attaches each seal member 22 of the cap 20 to the encapsulation member 14, as shown in FIGS. 1-5. In the exemplary embodiments of FIGS. 1-5 the tether 24 is an elongated member having a first end connected to the encapsulation member 14 at a side of the connector body 12 and a second end connected to the seal member 22 of the cap 20. However, it is contemplated that the first end of the tether 24 may be monolithically or integrally formed into the encapsulation member 14 at any other location along the connector 10 such that the seal member 22 of the cap 20 can be easily removed and inserted back into the hollow opening 19 of the fastener boss 18. It is further contemplated that the junction between the first end of the tether 24 and the encapsulation member 14 may be thicker than the rest of the tether 24 to help better withstand repeated bending and flexing of the tether 24.

Figure 7D:
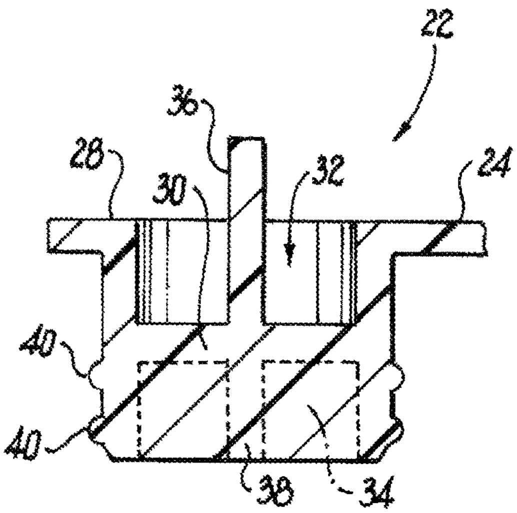

Turning now to FIGS. **7*a*-7*d*, each seal member 22 of each cap 20 is configured to provide an environmental seal for each respective opening 19 of the fastener bosses 18 before and after a respective fastener 58 has been secured the conductor 62 in the wire way cavity 13 of the connector body 12. Each seal member 22 includes a cylinder 26 having a proximal end portion 26*a* and a distal end portion 26*b*. The cylinder 26 may be a solid cylinder or a substantially hollow or hollowed out cylinder that has an outer diameter sufficient to fit within the opening of the fastener bosses 18 and environmentally seal the opening of the fastener bosses 18. In the exemplary embodiment shown, the cylinder 26 is a substantially hollow cylinder. The proximal end portion 26*a* includes a flanged portion 28 that has a larger diameter than a diameter of the cylinder 26 and that extends around a periphery of the proximal end portion 26*a*. The outer diameter of the flange portion 28 is preferably larger that the inner diameter of the opening of the fastener bosses 18 so that the flange portion 28 remains outside the opening of the fastener bosses 18. As best seen in FIGS. 4 and 7*d*, the second end of the tether 24 is connected to the flanged portion 28. The internal cavity within the substantially hollow cylinder 26 does not extend through the cylinder 26. Instead, the internal cavity is closed off roughly halfway along the longitudinal extent of the cylinder 26 by a partition 30, which forms an upper cavity 32 and a lower cavity 34, as shown in FIG. 7*d*. The upper cavity 32 includes a gripping member or tab 36 extending from the partition 30 within the upper cavity 32 beyond the flanged portion 28. The tab 36 facilitates grasping, e.g., manual grasping or tool aided grasping, of each seal member 22 of each cap 20 to remove the seal member 22 from or insert the seal member into a fastener boss 18. As shown in FIGS. 3, 7*b* and 7*d*, the lower cavity 34 includes a pair of cross members 38 that transversely extend from the partition 30 within the lower cavity 34. The lower cavity 34 is provided for weight reduction and cost savings, and the cross members 38 are provided for added structural support. An exterior surface of the distal end portion 26*b* further includes one or more outwardly extending peripheral ribs 40 that are configured to provide an interference fit connection or snap fit connection between each seal member 22 of each cap 20 and respective one of the fastener bosses 18**.

With reference to FIGS. 2-4 and 6, the cable connector 10 may include one or more removable cable adapters 42. The cable adapters 42 are preferably elastomeric members, which may also be referred to as wire way rockets, that may be formed via the same process, e.g., injection molding process, used to form the encapsulation member 14. Each cable adapter 42 is formed to have a predefined shape and size for insertion into one of the wire way bosses 16 to help seal a range of conductor sizes inserted into the wire way bosses 16 and/or to provide an environmental seal for the wire cavities 13 in the connector body 12 that do not have a conductor inserted therein. As best seen in FIGS. **6*a*-6*c*, the cable adapter 42 is generally conically shaped and includes a radially extending base portion 44, a longitudinally extending tubular lower portion 45, a longitudinally extending tubular sidewall 46, and a closed end portion 48. A diameter of the base portion 44 is larger than a diameter of the lower portion 45, which has a larger diameter than a diameter of the sidewall 46, such that when one of the cable adapters 42 is inserted into one of the wire way bosses 16, the base portion 44 is configured to abut an outer edge of the wire way boss 16, as can be seen in FIGS. 1 and 4**.

Continuing to refer to FIGS. **6*a*-6*c*, the sidewall 46 extends between the lower portion 45 and the closed end portion 48. The diameter of the sidewall 46 is stepped or sectionally tapered down along the length of the sidewall 46 to allow the utility worker to sever one or more steps or sections of the sidewall 46 along the length thereof to accommodate a correspondingly shaped or sized conductor to be inserted through the cable adapter 42 into the wire cavity 13, as seen in FIG. 5. Although in the exemplary embodiment of FIGS. 6*a* and 6*b* the sidewall 46 includes three steps 90, 92 and 94 having diminished diameters, the sidewall 46 may be formed to include more steps, each having a smaller diameter than a preceding step. However, in other embodiments, the diameter of the sidewall 46** may be a smooth taper instead of a stepped taper.

The sidewall 46 of the cable adapter 42 may include markings imprinted or molded thereon identifying the proper conductor range or diameter accommodated by the corresponding severed steps or sections thereof, such as the markings shown in FIGS. **6*a*-6*c*. For instance, the utility worker would sever or cut off the closed end portion 48, which has a smallest diameter opening in the cable adapter 42 to insert a #12 AWG to #8 AWG electrical conductor through the cable adapter 42 into the wire cavity 13. To insert a #6 AWG to #2 AWG electrical conductor through the cable adapter 42, the utility worker would sever two steps or sections, namely the closed end portion 48 and the adjacent step or section 94. The interior surface of the lower portion 45 and/or sidewall 46, shown in FIG. 4, may include radially extending protrusions 49 that extend into the hollow portion of the cable adapter 42 to enhance the grip of the cable adapter 42 on a conductor extending therethrough. The lower portion 45 of each cable adapter 42 may include outwardly extending peripheral ribs 50, seen in FIGS. 6*a* and 6*b*, that are designed to limit or possibly prevent water from passing through the wire boss 16 and entering the wire cavity 13**, as will be discussed in more detail below.

As noted above, each wire cavity 13 in the connector body 12 is configured to receive an electrical conductor 60, seen in FIG. 5, that can be inserted through a cable adapter 42 positioned within a wire way boss 16. In the embodiment shown, the conductor 60 is an insulated conductor having an electrical conductor (aka a wire) with an insulating jacket. The conductor 60 can then be extended into the wire cavity 13 of the connector body 12. Prior to insertion of the conductor 60 into the wire way boss 16, a utility worker may remove a portion of the insulation surrounding the wire 62 of the conductor 60 so that a predetermined length of wire is exposed. In turn, the utility worker can insert a tool, e.g., an Allen wrench or screwdriver, into the fastener boss 18 and torque down the fastener 58 to secure the exposed wires 62 in the wire way cavity 22 to the connector body 12.

Referring again to FIG. 4, each wire way boss 16 extends from a side of the connector body 12 by a sufficient length to permit the cable adapter 42 inserted into wire way boss 16 to enter the wire cavity 13 of the connector body 12. More particularly, each of the wire way boss 16 has the length allowing the cable adapter 42 inserted therethrough to extend into the wire cavity 13 of the connector body 12 at least to a plane A, seen in FIG. 4, to help minimize flexing of the cable adapter 42 when a wire 62 is secured to the connector body 12 by torquing the fastener 58. Preferably, the cable adapter 42 is not extended into the wire cavity beyond a plane B so as to avoid the cable adapter 42 interfering with the fastener 58 contacting the wire 62 when securing the wire 62 to the connector body 12.

An exterior surface of each wire way boss 16 may include a plurality of longitudinally extending supporting ribs 52 radially disposed around the periphery of each wire way boss 16, as shown for example in FIGS. 1, 4 and 5. The supporting ribs 52 provide additional structural support and rigidity for the wire way bosses 16. Additionally, as can be seen in FIGS. 2 and 3, a portion of the interior surface of each wire way boss 16 may include outwardly and radially extending grooves 54 that are configured to mate with or engage the peripheral ribs 50 of an inserted cable adapter 42 to limit or possibly prevent water from passing through the wire way boss 16 and entering the wire cavity 13 of the connector body 12.

Referring now to FIGS. 8-13, another exemplary embodiment of a cable connector 100 according to the present disclosure is shown. In this exemplary embodiment, the cable connector 100 includes a connector body 112 that is encased or covered in a layer of insulating material 114, as seen in FIG. 10. In the exemplary embodiment shown, the connector body 112 is a generally rectangular body. However, the connector body 112 may be square in shape, cylindrical in shape or any other suitable shape to make the electrical connections described herein. The connector body 112 is preferably formed of electrically conductive metallic material, such as aluminum, aluminum alloy, copper or brass. The connector body 112 includes one or more spaced apart wire cavities 113 arranged along one side of the connector body 112 and one or more spaced apart apertures 115 arranged along an adjacent side of the connector body 112, as shown in FIG. 10. In the exemplary embodiment shown in FIG. 10, each aperture 115 is oriented at right angle relative to a respective wire cavity 113. Each aperture 115 intersects the wire cavity 113, as seen in FIG. 11, so that the wire way cavity 113 of the connector body 112 is in communication with the respective aperture 115. Preferably, each wire cavity 113 and aperture 115 are blind holes, i.e., they extend inwardly into the connector body 112, but do not extend fully through the connector body 112.

The layer of insulating material 114 may be an injection molded thermoplastic or elastomeric compound that is formed to substantially surround or overmold the connector body 112. For ease of description, the layer of insulating material 114 may also be referred to herein as the encapsulation member 114. The encapsulation member 114 is formed or molded to include one or more spaced apart tubular and generally hollow ports 116, each of which may also be referred to herein as a “wire way boss.” Each wire way boss 116 extends outwardly from the same side of the connector body 112 as the wire cavities 113 so that the wire cavities are in communication with the hollow portion of the wire way bosses 116. The wire way bosses 116 provide access to the wire cavities 113 so that one or more conductors, e.g., conductors 160 and 162, can pass through the wire way bosses 116 into the wire cavity 113, as shown in FIGS. 12 and 13. The encapsulation member 114 also includes one or more spaced apart tubular and generally hollow ports 118, each of which may also be referred to herein as a “fastener boss.” Each fastener boss 118 extends outwardly from the same side of the connector body 112 as the aperture 115, seen in FIG. 10, so that the apertures are in communication with the hollow portion of the fastener bosses 118. The fastener bosses 118 provide access to the apertures 115 so that one or more fasteners 158, e.g., set screws, in the connector body 112 can be accessed by utility workers with conventional tools, or so that one or more fasteners 158 can be pass through the fastener bosses 118 into the apertures 115, as shown in FIGS. 10-13. As it should be apparent from FIGS. 12 and 13, each fastener 158 can then be tightened to secure a wire extending in respective one of the wire cavities 113 to the connector body 112. In the exemplary embodiment shown, like each wire cavity 113 and aperture 115 pair, the wire way bosses 116 are oriented at right angles relative to the fastener bosses 118.

Continuing to refer to FIGS. 10-13, the encapsulation member 114 is formed or molded to further include one or more cap assemblies 120. Each cap assembly 120 includes a seal member 122 and a tether 124. For ease of description, the cap assemblies 120 may also be referred to herein as the “cap” in the singular and the “caps” in the plural. The tether 124 of the cap 120 is preferably monolithically or integrally formed into the encapsulation member 114 during, for example, the injection molding process so that the tether is permanently attached to the encapsulation member 114. The seal members 122 of the caps 120, which are described in more detail below, are configured to cover or cap the hollow openings of the fastener bosses 118, as shown in FIGS. 11-13.

As mentioned, the process that forms the encapsulation member 114, e.g., an injection molding process, also forms the caps 120 as one monolithically or integrally formed unit. The tether 124 of each cap 120 is a flexible tether that attaches each seal member 122 of the cap 120 to the encapsulation member 114, as shown in FIGS. 10-13. In the exemplary embodiments of FIGS. 10-13 the tether 124 is an elongated member having a first end attached to the encapsulation member 114 at a side of the connector body 112 and a second end connected to the seal member 122 of the cap 120. However, it is contemplated that the first end of the tether 124 may be monolithically or integrally formed into the encapsulation member 114 at any other location along the connector 100 such that the seal member 122 of the cap 120 can be easily removed and inserted back into the hollow opening 119 of the fastener boss 118. It is further contemplated that the junction between the first end of the tether 124 and the encapsulation member 114 may be thicker than the rest of the tether 124 to help better withstand repeated bending and flexing of the tether 124.

Turning now to FIGS. **14*a*-14*d*, each seal member 122 of each cap 120 is configured to provide an environmental seal for each respective opening of the fastener bosses 118 before and after a respective fastener 158 has been secured the conductor, conductor 160 and 162, in the wire way cavity 113 of the connector body 112. Each seal member 122 includes an insert portion 126 and a flange portion 128. In this exemplary embodiment, the insert portion 126 has a proximal end portion 126*a* and a distal end portion 126*b*. The insert portion 126 may be a solid member or a substantially hollow or a hollowed out member that has an outer perimeter, e.g., diameter, sufficient to fit within the opening of the fastener bosses 118 and environmentally seal the opening of the fastener bosses 118. The insert portion 126 is shaped to fit within the opening 119** of the fastener bosses 118. For example, the insert portion 126 may have a cylindrical, square, rectangular, triangular or other shape to fit within the opening 119 of the fastener bosses. In the embodiment shown in FIGS. 14*a*-14*d*, the insert portion 126 is a cylindrical member that is substantially hollow having one or more internal cavities 134. The one or more internal cavities 134 within the substantially hollow insert portion 126 may or may not extend through the entire length of the insert portion 126. In the exemplary embodiment shown, the one or more internal cavities 134 within the insert portion 126 extend through the entire length of the insert portion 126. As shown in FIGS. 10, 14*b* and 14*d*, the substantially hollow insert portion 126 includes a pair of cross members 138 that transversely extend from one side of the insert portion 126 to an opposite side of the insert portion 126 and form the one or more cavities 134. The one or more cavities 34 are provided for weight reduction and cost savings, and the cross members 138 are provided as added structural support for the insert portion 126. An exterior surface of the distal end portion 126*b* of the insert portion 126 may include one or more outwardly extending peripheral ribs 140 that are configured to provide an interference fit connection or snap fit connection between each seal member 122 of each cap 120 and a respective one of the fastener bosses 118.

Continuing to refer to FIGS. 14*a*-14*d*, the flanged portion 128 of the seal member 122 may be integral with or monolithically formed to the proximal end portion 126*a* of the insert portion 126, or the flanged portion 128 may be secured to the proximal end portion 126*a* of the insert portion 126 using, for example, adhesives or welds, e.g., sonic welds. Preferably, the flanged portion 128 has a larger perimeter, e.g., diameter, than an outer perimeter, e.g., outer diameter, of the insert portion 126. The outer perimeter, e.g., the outer diameter, of the flange portion 128 is preferably larger that the inner diameter of the opening of the fastener bosses 118 so that the flange portion 128 remains outside the opening of the fastener bosses 118. The flanged portion 128 of the seal member 122 may be integral with or monolithically formed to the second end 124*a* of the tether 124, or the flanged portion 128 of the seal member 122 may be secured to the second end of the tether 124 using, for example, adhesives or welds, e.g., sonic welds. As best seen in FIGS. 11 and 14*d*, the flanged portion 128 of the seal member 122 is integral with or monolithically formed to the second end 124*a* of the tether 124. An upper surface 128*a* of the flange member 128 may include a gripping member or tab 136 extending therefrom. The tab 136 facilitates grasping, e.g., manual grasping or tool aided grasping, of each seal member 122 of each cap 120 when removing the seal member 22 from or inserting the seal member into a fastener boss 118.

With reference to FIGS. 6*a*, 6*b*, 6*c* and 8-10, the cable connector 100 may also include one or more removable cable adapters 42 having a base portion 44, a longitudinally extending tubular lower portion 45, a longitudinally extending tubular sidewall 46, and a closed end portion 48. The cable adapters 42 are described above and for ease of description and clarity will not be repeated here. It is noted however, that the sidewall 46 extends between the lower portion 45 and the closed end portion 48, and the diameter of the sidewall 46 is stepped or sectionally tapered down along the length of the sidewall 46 to allow the utility worker to sever one or more steps or sections of the sidewall 46 along the length thereof to accommodate a correspondingly shaped or sized conductor to be inserted through the cable adapter 42 into the wire cavity 13, as seen in FIGS. 12 and 13.

As noted above, each wire cavity 113 in the connector body 112 is configured to receive an electrical conductor, e.g., conductor 160, seen in FIG. 12, and conductor 162, seen in FIG. 13. The conductors 160 and 162 are different gauge conductors. Typically, the electrical conductors are insulated conductors having an electrical wire surrounded by insulating jacket. The electrical conductor can be inserted through the cable adapter 42 positioned within a wire way boss 116 into the wire cavity 113 of the connector body 112. Prior to insertion of the conductor 160 through the cable adapter 42 positioned within a wire way boss 116, a utility worker may remove a portion of the insulation surrounding the wire 164 of the conductor 160 or the wire 166 of the conductor 162 so that a predetermined length of wire is exposed. Once the wire is positioned the wire cavity 113, the utility worker can insert a tool, e.g., an Allen wrench or screwdriver, into the fastener boss 118 and torque down the fastener 158 to secure the wire in the wire cavity 113 to the connector body 112.

Referring again to FIG. 11, each wire way boss 116 extends from a side of the connector body 12 by a sufficient length to permit the cable adapter 42 inserted into wire way boss 116 to enter the wire cavity 113 of the connector body 112. More particularly, each wire way boss 116 has a length allowing the cable adapter 42 inserted therethrough to extend into the wire cavity 113 of the connector body 112 at least to a plane A, seen in FIG. 11, to help minimize flexing of the cable adapter 42 when a wire 164, 166 is secured to the connector body 112 by torquing the fastener 158. Preferably, the cable adapter 42 is not extended into the wire cavity beyond a plane B so as to avoid the cable adapter 42 interfering with the fastener 158 contacting the wire, e.g., wire 164, or 166, when securing the wire to the connector body 112.

Referring again to FIGS. 8-10, an exterior surface of each wire way boss 116 may include a plurality of longitudinally extending supporting ribs 152 radially disposed around the periphery of each wire way boss 116. Each supporting rib 152 is configured and dimensioned to provide additional structural support and rigidity for the wire way bosses 116. In the embodiment of FIGS. 8-10, the plurality of supporting ribs 152 may be integral with or monolithically formed into the encapsulation member 114 and/or the wire way bosses 116, or the plurality of supporting ribs 152 may be secured to the encapsulation member 114 and/or the wire way bosses 116 using, for example, adhesives or welds, e.g., sonic welds. Additionally, as can be seen in FIGS. 8 and 9, a portion of the interior surface of each wire way boss 116 may include one or more outwardly and radially extending grooves 154 that are configured to mate with or engage the peripheral ribs 50 of an inserted cable adapter 42 to limit or possibly prevent water from passing through the wire way boss 116 and entering the wire cavity 113 of the connector body 112.

While illustrative embodiments of the present disclosure have been described and illustrated above, it should be understood that these are exemplary of the disclosure and are not to be considered as limiting. Additions, deletions, substitutions, and other modifications can be made without departing from the spirit or scope of the present disclosure. Accordingly, the present disclosure is not to be considered as limited by the foregoing description.

What is claimed is:

1. A cable connector comprising:

a connector body having a first side and a second side, the first side including a plurality of cable cavities and the second side including a plurality of fastener receiving apertures, where one cable cavity is in communication with one fastener receiving aperture;

an encapsulation member covering the connector body, the encapsulation member including:

a plurality of cable ports, each of the plurality of cable ports having a hollow center portion, each of the plurality of cable ports extend from the first side of the connector body such that the hollow center portion of the cable port is in communication with one of the plurality of cable cavities;

a plurality of fastener ports, each of the plurality of fastener ports having a hollow center portion defining an interior surface of the fastener port, each of the plurality of fastener ports extend from the second side of the connector body such that the hollow center portion of the fastener port is in communication with one of the plurality of fastener receiving apertures; and a plurality of cap assemblies, each of the plurality of cap assemblies having a tether with a seal member at a first end of the tether and a second end of the tether formed into the encapsulation member such that the second end of the tether is part of the encapsulation member, wherein the seal member of each of the plurality of cap assemblies is configured to be inserted into the hollow center portion of one of the plurality of fastener ports.

2. The cable connector according to claim 1, further comprising a plurality of cable adapters, each of the plurality of cable adapters is configured to receive a range of conductor sizes and shaped and sized for insertion into the hollow center portion of one of the plurality of cable ports, wherein when one of the plurality of cable adapters is inserted into the hollow center portion of one of the plurality of cable ports, the one of the plurality of cable adapters extends at least partially into one of the plurality of cable cavities.

3. The cable connector according to claim 1, wherein each of the plurality of cable ports is integrally molded into the encapsulation member.

4. The cable connector according to claim 1, wherein each of the plurality of fastener ports is integrally molded into the encapsulation member.

5. The cable connector according to claim 1, wherein each of the plurality of fastener receiving apertures are at least partially threaded apertures, and a fastener is threaded at least partially into each of the plurality of fastener receiving apertures.

6. The cable connector according to claim 1, wherein the seal member for each of the plurality of cap assemblies includes at least one rib extending around an exterior surface of the seal member and outwardly from the exterior surface of the seal member such that when the seal member is inserted into the hollow center portion of one of the plurality of fastener ports the at least one rib contacts the interior surface of the one of the plurality of fastener ports.

7. The cable connector according to claim 1, wherein each of the plurality of cable ports has an exterior surface, and each of the plurality of cable ports includes at least one supporting rib extending from the exterior surface of each of the plurality of cable ports, and wherein a portion of the at least one supporting rib is molded into the encapsulation member.

8. A cable connector comprising:

a connector body having a first side and a second side, the first side including a plurality of cable cavities and the second side including a plurality of fastener receiving apertures, where one cable cavity is in communication with one fastener receiving aperture;

an encapsulation member surrounding the connector body and providing access to each of the plurality of cable cavities and each of the plurality of fastener receiving apertures;

a plurality of cable ports, each of the plurality of cable ports having a hollow center portion, and each of the plurality of cable ports extending from the first side of the connector body such that the hollow center portion of one of the plurality of cable ports is in communication with one of the plurality of cable cavities;

a plurality of fastener ports, each of the plurality of fastener ports having a hollow center portion, each of the plurality of fastener port extending from the second side of the connector body such that the hollow center portion of one of the plurality of fastener ports is in communication with one of the plurality of fastener receiving apertures; and a plurality of cap assemblies, where each of the plurality of cap assemblies includes a tether having a seal member at a first end and a second end integral with the encapsulation member, the seal member being configured to be at least partially inserted into the hollow center portion of one of the plurality of fastener ports.

9. The cable connector according to claim 8, further comprising a plurality of cable adapters, each of the plurality of cable adapters is configured to receive a range of conductor sizes and is shaped and sized for insertion into the hollow center portion of one of the plurality of cable ports, wherein when one of the plurality of cable adapters is inserted into the hollow center portion of one of the plurality of cable ports, the one of the plurality of cable adapters extends at least partially into one of the plurality of cable cavities.

10. The cable connector according to claim 8, wherein each of the plurality of cable ports is integrally molded into the encapsulation member.

11. The cable connector according to claim 8, wherein each of the plurality of fastener ports is integrally molded into the encapsulation member.

12. The cable connector according to claim 8, wherein each of the plurality of fastener receiving apertures are at least partially threaded apertures, and a fastener is threaded at least partially into each of the plurality of fastener receiving apertures.

13. The cable connector according to claim 8, wherein the seal member for each of the plurality of cap assemblies includes at least one rib extending around an exterior surface of the seal member and outwardly from the exterior surface of the seal member such that when the seal member is inserted into the hollow center portion of one of the plurality of fastener ports the at least one rib contacts an interior surface of the one of the plurality of fastener ports fastener ports.

14. The cable connector according to claim 8, wherein each of the plurality of cable ports has an exterior surface, and each of the plurality of cable ports includes at least one supporting rib extending from the exterior surface of each of the plurality of cable ports, and wherein a portion of the at least one supporting rib is molded into the encapsulation member.

15. A cable connector comprising:

a connector body having a first side and a second side, the first side including a plurality of cable cavities and the second side including a plurality of fastener receiving apertures, where one cable cavity is in communication with one fastener receiving aperture;

an encapsulation member covering the connector body, the encapsulation member including:

a plurality of cable ports extending from the first side of the connector body, each of the plurality of cable ports having a hollow center portion, and each of the plurality of cable ports having one end integrally molded into the encapsulation member such that the hollow center portion of one of the plurality of cable ports is in communication with one of the plurality of cable cavities;

a plurality of fastener ports extending from the second side of the connector body, each of the plurality of fastener ports having a hollow center portion, each of the plurality of fastener port having one end integrally molded into the encapsulation member such that the hollow center portion of the fastener port is in communication with one of the plurality of fastener receiving apertures; and a plurality of cap assemblies, each of the plurality of cap assemblies having a tether with a seal member at a first end of the tether and a second end of the tether formed into the encapsulation member such that the second end of the tether is part of the encapsulation member, the seal member being configured to be at least partially inserted into the hollow center portion of one of the plurality of fastener ports.

16. The cable connector according to claim 15, further comprising a plurality of cable adapters, each of the plurality of cable adapters is configured to receive a range of conductor sizes and shaped and sized for insertion into the hollow center portion of one of the plurality of cable ports, wherein when one of the plurality of cable adapters is inserted into the hollow center portion of one of the plurality of cable ports, the one of the plurality of cable adapters extends at least partially into one of the plurality of cable cavities.

17. The cable connector according to claim 15, wherein each of the plurality of fastener receiving apertures are at least partially threaded apertures, and a fastener is threaded at least partially into each of the plurality of fastener receiving apertures.

18. The cable connector according to claim 15, wherein the seal member for each of the plurality of cap assemblies includes at least one rib extending around an exterior surface of the seal member and outwardly from the exterior surface of the seal member such that when the seal member is inserted into the hollow center portion of one of the plurality of fastener ports the at least one rib contacts an interior surface of the one of the plurality of fastener ports fastener ports.

19. The cable connector according to claim 15, wherein each of the plurality of cable ports has an exterior surface, and each of the plurality of cable ports includes at least one supporting rib extending from the exterior surface of each of the plurality of cable ports, and wherein a portion of the at least one supporting rib is molded into the encapsulation member.

* * * * *